(12) United States Patent
Kapoor et al.

(10) Patent No.: US 11,037,113 B2
(45) Date of Patent: Jun. 15, 2021

(54) NETWORK OF COMPUTING NODES AND A METHOD OF OPERATING THE COMPUTING NODES TO EFFECTUATE REAL-TIME BANK ACCOUNT-TO-BANK ACCOUNT MONEY TRANSFER

(71) Applicant: Morgan Stanley Services Group Inc., New York, NY (US)

(72) Inventors: Uma Kapoor, New York, NY (US); Olga Zeltser, New York, NY (US); Chris Thurber, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/634,412

(22) PCT Filed: Jul. 31, 2019

(86) PCT No.: PCT/US2019/044390
§ 371 (c)(1),
(2) Date: Jan. 27, 2020

(87) PCT Pub. No.: WO2020/028513
PCT Pub. Date: Feb. 6, 2020

(65) Prior Publication Data
US 2021/0035211 A1      Feb. 4, 2021

Related U.S. Application Data

(63) Continuation-in-part of application No. 16/050,565, filed on Jul. 31, 2018, now Pat. No. 10,410,190.

(51) Int. Cl.
*G06Q 40/00* (2012.01)
*G06Q 20/10* (2012.01)
(Continued)

(52) U.S. Cl.
CPC .......... *G06Q 20/108* (2013.01); *G06F 9/547* (2013.01); *G06F 16/27* (2019.01); *G06Q 20/326* (2020.05);
(Continued)

(58) Field of Classification Search
None
See application file for complete search history.

(56) References Cited

U.S. PATENT DOCUMENTS 7,644,037 B1 * 1/2010 Ostrovsky .............. G06Q 20/10
705/40
9,830,656 B2   11/2017 Pessin
(Continued)

FOREIGN PATENT DOCUMENTS

| JP | 2005512173 A | 4/2005 |
| JP | 2014059901 A | 4/2014 |

(Continued)

OTHER PUBLICATIONS

Ritcha Ranjan: "Tokenization of a Physical Debit or Credit Card for Payment." Technical Disclosure Commons (Jan. 31, 2016).*
(Continued)

*Primary Examiner* — Olabode Akintola
(74) *Attorney, Agent, or Firm* — K&L Gates LLP (57) ABSTRACT

A network of computing nodes and a method of operating the computing nodes effectuate, in real-time, an international, money transfer from the bank account of a first person (the payer) in a first country to the bank account of a second person (the beneficiary) in a second, different, country.

10 Claims, 7 Drawing Sheets

(51) Int. Cl.
*G06Q 20/38* (2012.01)
*G06Q 20/36* (2012.01)
*G06Q 20/32* (2012.01)
*G06F 16/27* (2019.01)
*G06F 9/54* (2006.01)
*G06Q 20/40* (2012.01)
*G06Q 30/00* (2012.01)
*G06Q 40/02* (2012.01)
*G06Q 40/04* (2012.01)

(52) U.S. Cl.
CPC ..... *G06Q 20/3223* (2013.01); *G06Q 20/3678* (2013.01); *G06Q 20/381* (2013.01); *G06Q 20/38215* (2013.01); *G06Q 20/40* (2013.01); *G06Q 30/0185* (2013.01); *G06Q 40/02* (2013.01); *G06Q 40/04* (2013.01)

(56) References Cited

U.S. PATENT DOCUMENTS

| | | | |
|---|---|---|---|
| 10,713,731 | B2 | 7/2020 | Karame et al. |
| 2003/0233318 | A1 | 12/2003 | King et al. |
| 2004/0128240 | A1 | 7/2004 | Yusin |
| 2011/0313921 | A1* | 12/2011 | Dheer ................ G06Q 20/223 705/42 |
| 2016/0132851 | A1 | 5/2016 | Desai et al. |
| 2016/0300207 | A1 | 10/2016 | Novac et al. |
| 2016/0342976 | A1 | 11/2016 | Davis |
| 2016/0342989 | A1 | 11/2016 | Davis et al. |
| 2017/0024744 | A1 | 1/2017 | Finch et al. |
| 2017/0109714 | A1 | 4/2017 | Alcorn et al. |
| 2017/0132626 | A1 | 5/2017 | Kennedy et al. |
| 2017/0237554 | A1 | 8/2017 | Jacobs et al. |
| 2017/0243181 | A1* | 8/2017 | Tyma ................ G06Q 20/385 |
| 2017/0266103 | A1 | 9/2017 | Herrmann et al. |
| 2017/0345011 | A1 | 11/2017 | Salami et al. |
| 2018/0082294 | A1 | 3/2018 | Davis et al. |
| 2018/0082303 | A1 | 3/2018 | Chan-Bauza et al. |
| 2018/0113752 | A1 | 4/2018 | Derbakova et al. |
| 2018/0144328 | A1 | 5/2018 | Finch et al. |
| 2018/0144329 | A1 | 5/2018 | Finch et al. |
| 2018/0197155 | A1 | 7/2018 | Georgen et al. |
| 2018/0197167 | A1 | 7/2018 | Ganesan et al. |

FOREIGN PATENT DOCUMENTS

| | | | | |
|---|---|---|---|---|
| JP | 2014081690 | A | 5/2014 | |
| JP | 2018525758 | A | 9/2018 | |
| JP | 2019521450 | A | 7/2019 | |
| NO | 2017011596 | A1 | 1/2017 | |
| WO | 03046691 | A2 | 6/2003 | |
| WO | 03069444 | A2 | 8/2003 | |
| WO | WO 2016065390 | A1 * | 5/2016 | ........... G06Q 20/065 |
| WO | 2016/186873 | A1 | 11/2016 | |
| WO | 2017/027900 | A1 | 2/2017 | |
| WO | 2017/070469 | A1 | 4/2017 | |
| WO | 2017/098519 | A1 | 6/2017 | |

OTHER PUBLICATIONS

"Committee on Payments and Market Infrastructures: Cross-border retail payments," Bank for International Settlements, pp. 1-45. Feb. 2018.
"Innovations for a Cashless World; Consumer Desire and the Future of Payments," pp. 1-75, 2017.
Windh, Jennifer, "Peer-to-peer payments: Surveying a rapidly changing landscape," Federal Reserve Bank of Atlanta, pp. 1-20, Aug. 15, 2011.
International Search Report and Written Opinion for International Patent Application No. PCT/US2019/044390 dated Oct. 10, 2019.

* cited by examiner

NETWORK OF COMPUTING NODES AND A METHOD OF OPERATING THE COMPUTING NODES TO EFFECTUATE REAL-TIME BANK ACCOUNT-TO-BANK ACCOUNT MONEY TRANSFER

PRIORITY CLAIM

The present application is a national stage application under 35 U.S.C. § 371 of PCT application Serial No. PCT/US19/44390, filed Jul. 31, 2019, which claims priority to U.S. patent application Ser. No. 16/050,565, filed Jul. 31, 2018, now U.S. Pat. No. 10,410,190, issued Sep. 10, 2019 having the same title as indicated above, and both of which are incorporated herein by reference in their entirety.

BACKGROUND

Digital payment systems are systems that allow individuals, from a computer or mobile device, to pay transfer money electronically to another party, such as to pay for goods or services, or make a monetary gift or donation, via a computing network, without having to use physical cash, checks or credit cards. Some digital payment systems allow a registered user (the payer) of the mobile payment to transfer money from their bank account to the bank account of another person (the beneficiary or payee) that also has a bank account registered with the system, so long as both bank accounts are located in the same country. The process to wire-transfer money to a person in another country is more laborious. Complicated forms, which require, among other things, personal identifying information of the beneficiary and the beneficiary's bank, as well as information about intermediary banks if any, have to be completed, which increases the time that it takes to complete the cross-border payment. Also, different time zones and holiday schedules complicate completion of cross-border transfer in a single day. There are also high fees associated with international bank transfers, which makes it only practical for high transfer amounts (so that the fees are a relatively small percentage of the transaction).

SUMMARY

In one general aspect, the present invention is directed to a network of computing nodes and a method of operating the computing nodes to effectuate, in real-time, a money transfer from the bank account of a first person (the payer) to the bank account of a second person (the beneficiary). The payer and the beneficiary can be in the same or different countries. The transfers of the present invention are in real-time and do not require personal identifying information of the beneficiary other than the beneficiary's mobile phone number or email address. That is, unlike existing international payment schemes, the payer does not need to specify the beneficiary's bank, bank account and routing numbers, the beneficiary's bank address, etc. In various embodiments, the present invention utilizes distributed ledger technology and/or API-based network solutions so that the transactions are irrevocable and immutable.

These and other benefits of the present invention will be apparent from the description that follows.

FIGURES

Various embodiments of the present invention are described herein by way of example in connection with the following figures, wherein.

DESCRIPTION

Figure 1:
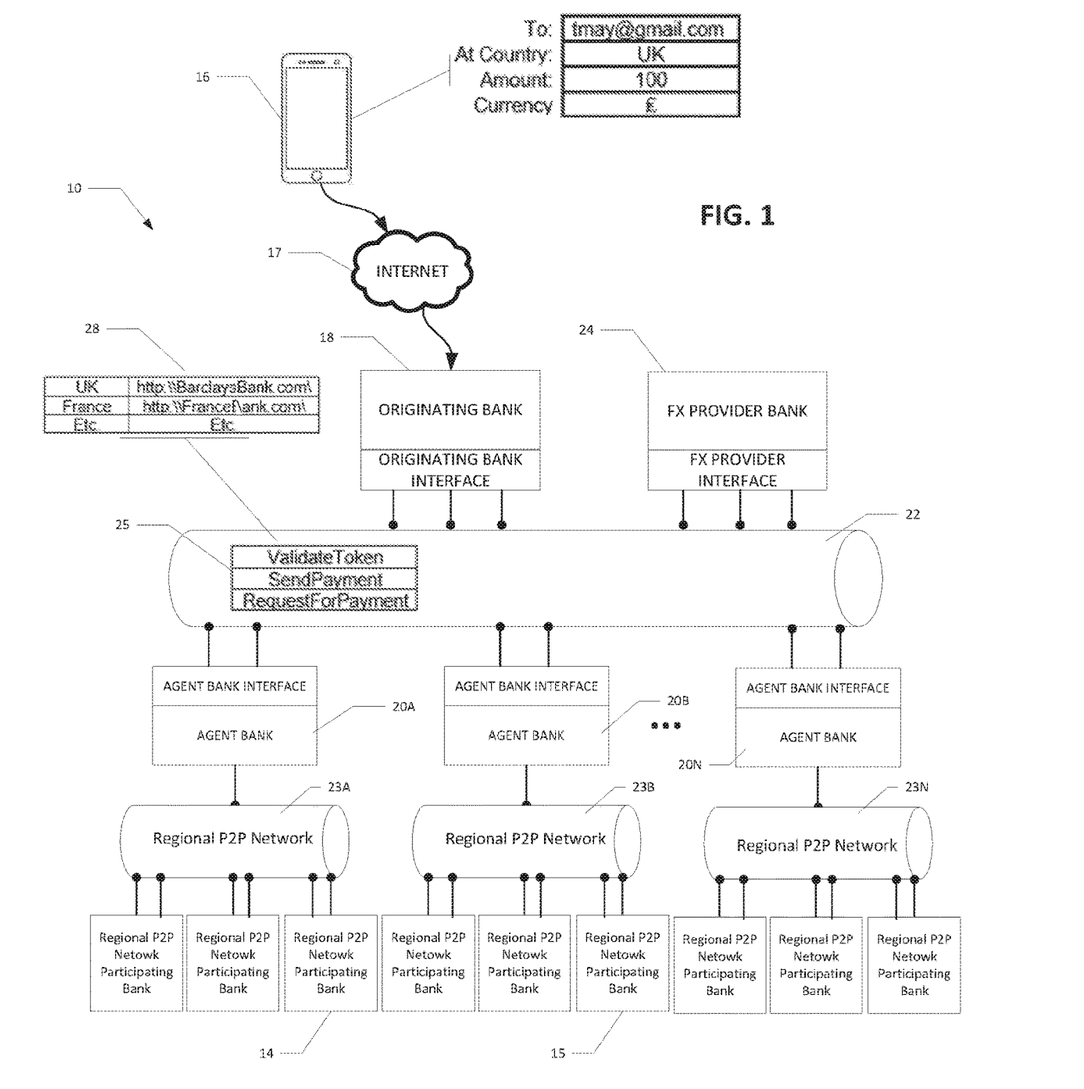
FIG. 1 is a diagram of a system for transferring, in real time, money from a bank account of a payer in a first country to a bank account of a beneficiary in a second, different, country according to various embodiments of the present invention.
Figure 2:
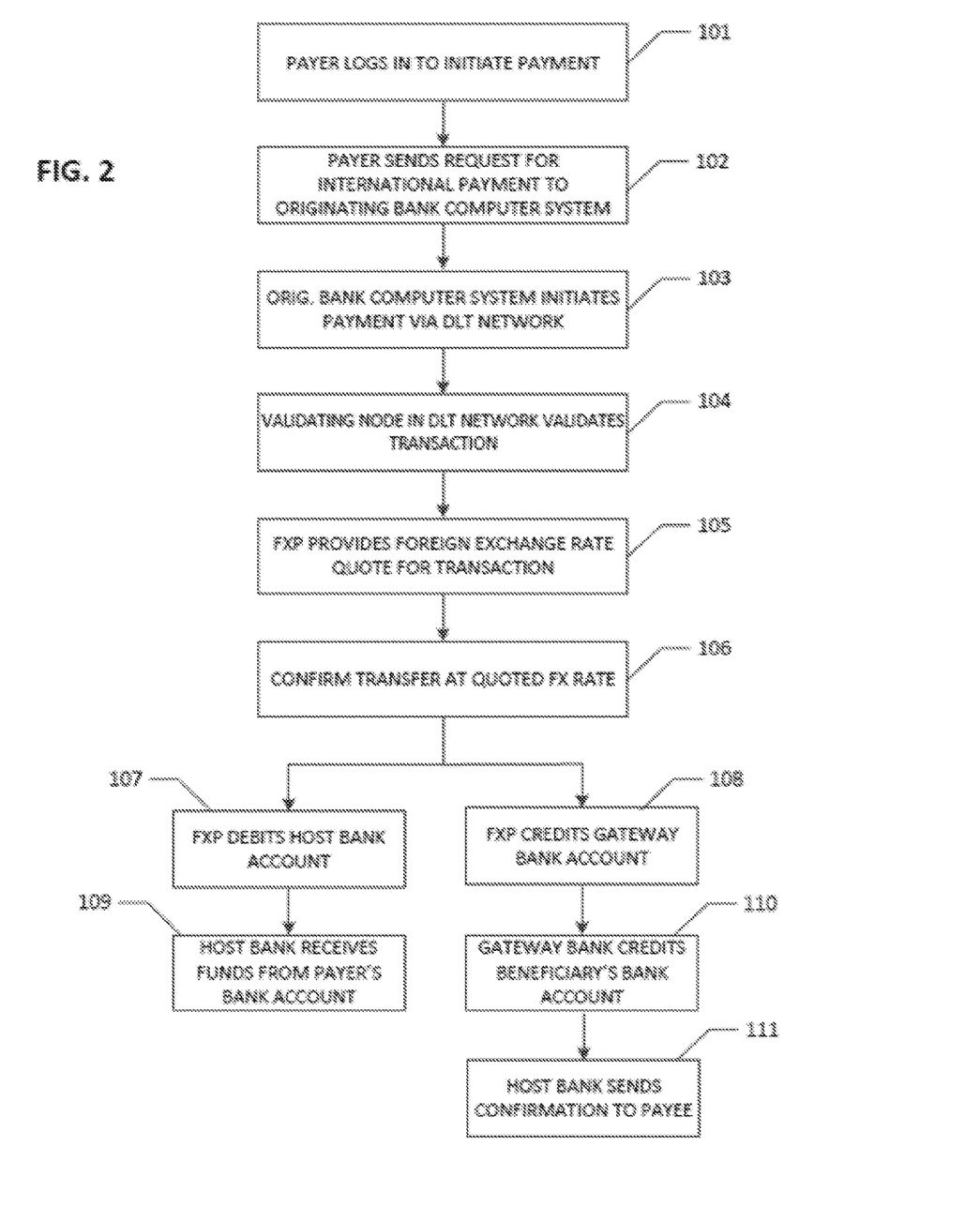
FIG. 2 is a flow chart depicting a method performed by the system of FIG. 1 according to various embodiments of the present invention.

FIG. 1 is a block diagram of a computer network or system 10 for transmitting, in real time, money electronically from the bank account of a payer, at an originating bank 18, to the bank account of another person or entity, the "beneficiary," at a bank 14. Correspondingly, FIG. 2 is a flow chart of a process that can be performed by the system 10 of FIG. 1 to make the real time, electronic bank transfer. In various embodiments, but not necessarily, the payer (and his/her bank account at originating bank 18) is located in a first country and the beneficiary (and his/her bank account at bank 14) is located in a second, different country. This international or cross-border embodiment is described first. The payer may be a person or a business, and the beneficiary may be a person or a business, such that bank-account-to-bank-account fund transfers with embodiments of the present invention could be from person-to-person, person-to-business, business-to-business and business-to-person.

At step 101 (see FIG. 2), to initiate the money transfer, the payer may log into, at a computer device 16 of the payer, a mobile app or website of a digital payment system ("money transfer app"). Preferably, the money transfer app is provided by the originating bank 18 that provides the international digital payment system according to the present invention. By logging into or otherwise accessing the app or website, the payer's computer device 16 connects via a computer network (e.g., the Internet) 17 to a computer system of the originating bank ("originating bank computer system" 18). The originating bank computer system 18 may be implemented with one, or more preferably a number of network servers, such as part of a data center. The computer device 16 may communicate with the originating bank computer system 18 via a mobile network (e.g., a cellular network operated by a wireless carrier), the Internet, a WiFi network, etc.

Preferably, the beneficiary's bank account, at the bank 14, is registered with a Regional Person-to-Person P2P Payment Network 23A in the second (beneficiary's) country. As indicated in FIG. 1 and as will apparent from the description herein, the international P2P payment system of the present invention could be extended to multiple countries with their respective, Regional P2P networks 23B-N. A digital payment system or Regional P2P Network is a digital payment network that enables a payer to electronically transfer money from the payer's bank account to another user's bank account. Zelle is an example of a US Regional P2P Network; Paym is a Regional P2P Network for the United Kingdom; Interac is the Canadian P2P Network; and other digital payment systems exist in other countries.

Currently, such Regional P2P Networks do not permit cross-border transfers, such that currently with such Regional P2P Networks, the bank accounts of the payer and beneficiary have to in the same country.

Figure 3:
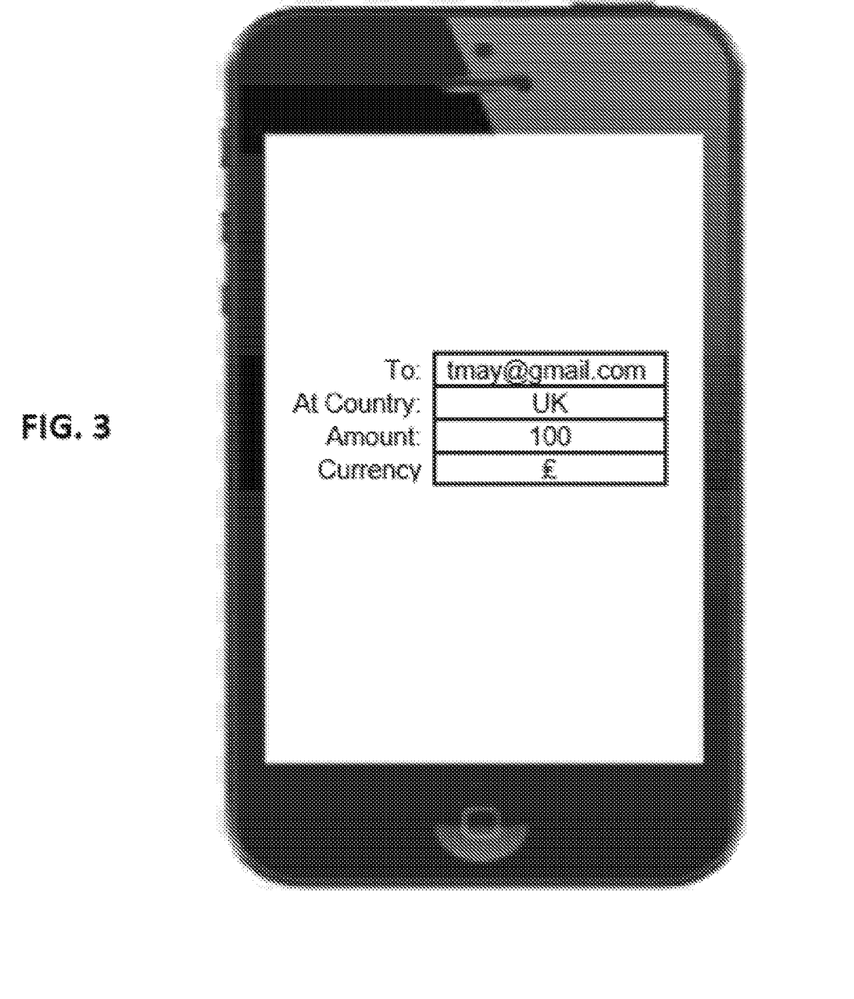
FIG. 3 depicts a user interface on a computing device of a payer for initiating the transfer according to various embodiments of the present invention.

In various embodiments, after logging in to the money transfer app, the payer specifies the amount of the payment in the currency of the beneficiary's bank account (e.g., Y units of currency of the beneficiary's (the "second") country), a token identifier for the beneficiary, and the country of the beneficiary's bank account, as shown in the examples of FIGS. 1 and 3. The token identifier for the beneficiary is the identifier that the beneficiary has registered with the Regional P2P Network 23A in the beneficiary's country. Typically, the beneficiary's token identifier is the beneficiary's mobile phone number or email address. Preferably, no other personal identifying information is used by the payer or originating bank 18 to identify the beneficiary. As such, the payer does not need to specify the beneficiary's mailing address, beneficiary's bank account number, the beneficiary's bank, the address of the beneficiary's bank, etc. When the payer inputs the beneficiary's country, the originating bank computer system 18 may update the user interface for the payer on the payer's computer device 16 to show the currency for the beneficiary's country. In FIGS. 1 and 3 for example, the payer input "UK" for the beneficiary's country, so the user interface is updated to indicate British pounds, £. In other embodiments, the payer could input the amount to be transferred in the payer's currency (as opposed to the beneficiary's currency), and the system would determine the corresponding amount in the beneficiary's currency, as described below. For example, if the payer is located in the U.S. and the beneficiary is located in the UK, in such other embodiments, the payer could specify that $X USD is to be transferred from the payer's U.S. bank account (at originating bank 18), and the system would determine the corresponding number of British pounds to be credited to the beneficiary's bank account (at bank 14), as described below. In yet other embodiments, the system could deduce the regional P2P network 23A-N from the token, and prefill the country and currency by invoking, a Find Token ( ) API. If the beneficiary's phone number is used as the token, and if it includes a country code (e.g., 44 for UK, 81 for Japan, etc.), then the beneficiary country can be determined from the token and prefilled in the message.

The payer's computer device 16 is shown in FIGS. 1 and 3 as a mobile device, e.g., a smartphone. It could be any computer device that is capable of opening the money transfer app (e.g., mobile app or website) for making the transfer. For example, the payer's computer device 16 could be a mobile computing device, such as a smartphone, a table computer, a wearable computer, that stores and executes an app that opens a connection to the originating bank computer system 18 and allows the payer to specify the details of the transaction, such as shown in FIG. 3. In other embodiments, the payer's computer device 16 could be a laptop computer or a desktop computer with a browser, from which the payer can open a website hosted by the originating bank computer system 18 to specify the details of the transaction.

As shown in FIG. 1 and at step 102 of FIG. 2, the originating bank computer system 18 receives the payer's electronic communication initiating the money transfer. The originating bank computer system 18 may then, at step 103 of FIG. 2, electronically transmit or broadcast a message to execute the transaction to a payment computer network 22. In various embodiments, the computer network 22 is a decentralized, peer-to-peer network that employs distributed ledger technology, such as blockchain (a "DLT network").

A blockchain is a distributed ledger used to record financial transactions. In some cases, a blockchain includes of a series of data structures known as blocks each including a set of financial transactions. Each block includes a header with a hash derived from the contents of all the transactions in the block. A new block is inserted at the end of the blockchain by including a hash of the header of the last block in the chain in a previous block field in the header of the new block. This arrangement ensures that a change to the contents of a particular block in the chain will render the hashes in the previous block field incorrect for every subsequent block in the blockchain, thereby ensuring the consistency of the structure.

The blockchain is generally published to computing nodes of entities participating in the distributed transaction network, e.g., the network 22. In various embodiments, the blockchain could be public or, more preferably, a permission-based private network; in a private blockchain, the blockchain is published only to entities participating in a private distributed transaction network. In either case, the participating entities, e.g., computing nodes of the originating and agent banks or other computing nodes in the network 22, can verify new transactions simply by examining the contents of the blockchain, which includes the full financial record for all accounts in the network.

As such, the originating bank computer system 18 may broadcast the transaction by issuing a message for the transaction to all of the computing nodes in the DLT network 22. The message for the international bank account-to-bank account money transfer transaction according to embodiments of the present invention may include the token identifier for the beneficiary, the transaction amount in the payer's home currency, the beneficiary's country, and a cryptographic key for the originating bank 18 as a signature for the transaction.

One or more validator computing nodes 25 in the DLT network can validate the transaction at step 104 using, for example, specific validation rules that are set up for the DLT network 22 to validate such international person-to-person, real-time bank account transfers. Among other things, a validator computing node 25 can validate the originating bank based on the originating bank's cryptographic key in the block chain message issued by the originating bank computer system 18. Also, the validator node 25 can validate, based on the beneficiary's token included in the transaction's message, that the beneficiary has a bank account that is registered in the Regional P2P Network 23A of the beneficiary. As indicated in FIG. 1, the validating node 25 may validate the beneficiary's bank account by looking up, in a lookup table 28, the agent bank 20A-20N for the beneficiary's country. That is, the lookup table 28 may store a network address for each of the agent banks 20A-N, and the validator node 25 retrieves the address corresponding to the beneficiary's country (which is identified in the originating bank's message to the network 22). The look-up table 28 could be stored in a database at the validator node 25 and/or at some other computing node in the network 22. The validator node 25 can then send a message to the appropriate agent bank (in this example, agent bank 20A) at the network address specified in the look up table 28 to query whether the beneficiary has a bank account (at bank 14 in this example) that is registered in the Regional P2P Network 23A for the beneficiary's country. The validated transaction may then be stored in a block on the blockchain of the network 22 and encrypted with a hash by a computing node (e.g., the validator node 25) on the DLT network 22. At this point the validator node 25 may transmit an acknowledgment message to the originating bank computer system 18 via the computer network 22 indicating that the transaction is validated.

Assuming the transaction is validated, the network 22 can initiate the payment. At step 105, the network 22 may transmit a message electronically to a foreign exchange provider (FXP) 24 for a quote on an exchange from the currency of the payer's bank account (the "first country currency") to the currency of the beneficiary's bank account (the "second country currency"). Preferably, the FXP 24 has a nostro account of the originating bank 18 in the currency of the originating bank 18. A nostro account is an account that a bank, in this case the originating bank, holds in a foreign currency, in this case currency of the beneficiary's bank account, in another bank, in this case the FXP. Also, the agent bank 20 preferably has a nostro account at the FXP 24 in the currency of the beneficiary's bank account. The FXP 24 preferably provides to the originating bank computer system 18, electronically through a computer network (e.g. the DLT network 22), an electronic message with a quote at the then-applicable exchange rate; i.e., X units of the first country currency converts to Y units of second country currency. In various embodiments, one of the agent banks 20 could be the FXP 24. In case Nostro accounts are not setup at the FXP 24, an alternative settlement mechanism could be to wire the netted obligations between FXP and originating and agents banks. In this case, delayed settlement is introduced but the IOU's would be immutable.

At step 106, the transfer at the quoted exchange rate is confirmed. This step may involve, first, the originating bank computer system 18 confirming the transfer at the quoted exchange rate. In some variations of the invention, there may be multiple foreign exchange providers 24 on the network 22 from which the originating bank computer system 18 seeks and is provided foreign exchange quotes for the transfer. In such cases, the originating bank computer system 18 may execute systematic logic that selects the best foreign exchange rate based on parameters such as the best rate offered by the various foreign exchange providers 24 and their ratings. Step 106 can also involve, in various implementations, once the originating bank computer system 18 confirms the foreign exchange quote, the originating bank computer system 18 then providing a message with the exchange rate to the payer via the money transfer app that the payer used to initiate the transfer. Assuming the payer confirms the transfer at the quoted exchange rate, the originating bank computer system 18 can update the ledger for the transaction (e.g., add a block) with the agreed-to exchange rate and the payer's and originating bank's confirmation. At this point, the transaction across the three ledgers (originating bank, agent bank, and FXP) becomes immutable and cannot be altered. That way, per DLT, the agreed-to exchange rate and the confirmations are immutably and irrevocably recorded in the ledger.

The FXP 24 preferably acts as the liquidity provider for the transaction. That way, the originating and agent banks' accounts can be settled in real time, as opposed to being settled at the end of the day, which would expose the parties to a settlement risk. To execute the transfer, at step 107, the FXP 24, in real time, debits the originating bank's nostro account at the FXP X units of the first country currency (i.e., the currency of the payer's country) and, at step 108, credits the agent bank's nostro account at the FXP 24 Y units of the second country currency (i.e., the currency of the beneficiary's country). The originating bank 18 then, at step 109, debits X units of the first country currency from the payer's bank account at the originating bank 18 in real time. Similarly, at step 110, the agent bank 20A transfers Y units of second country currency to the beneficiary's bank account at the beneficiary's bank 14 in real time via the Regional P2P Network 23A in the beneficiary's country. Finally, at step 111, the originating bank computer system 18 can send confirmation to the payer, via the money transfer app, email, text, etc., that the payment was successful.

In the end, in real time, the payer's bank account is debited X units of the payer's currency and the beneficiary's bank account is credited Y units of the beneficiary's currency, and details about the transaction are recorded on the DLT network's distributed ledger, including the beneficiary's token (but not other personal identifying information of the beneficiary), the confirmed FX quote, the acceptance of the transaction by the originating bank, and confirmations of the payments.

In this context, "real time" refers to the time it takes for a computer system to processing incoming data and/or messages. Usually this is on the order seconds or fractions of a second. Thus, the money transfers described herein are completed in a matter of a few minutes, i.e., the money is deposited in the beneficiary's account within a few minutes after the payer's initiates the transfer, as opposed to hours or days after the payer initiates the transfer. The biggest delay are the communications between the (i) the originating bank computer system 18 and the payer via the digital payment system in the payer's country, particularly to get the payer's acceptance of the foreign exchange rate (see step 106), and (ii) the agent bank computer system 20 and the beneficiary's bank 24 via the digital payment system in the beneficiary's country. Thus, once the transaction is sent to the blockchain network 22, it is settled in real time and reflected in the originating bank's liquidity position in the blockchain scheme, with no need for an intermediary central authority to manage and with full transparency between all the peers in the network 22. Also, the transactions could be made at any time of day, any day of the week ("24/7"), as there is no requirement for any of the banks in the network to be open during normal business hours to execute the transfer.

In the above description, banks are the originator 18 and agents 20. In other embodiments, organizations or entities other than banks could operate as the originators (i.e., an originating entity 18) or as the agent (i.e., an agent entity 20).

In some embodiments, the FX provider 24 could be agent bank 20. In such circumstances, the FX provider/agent bank may provide a lesser FX spread. Also, regardless of whether the FX provider is an agent bank, the FX provider may provider wider spreads if the country of the originating bank 18 is higher risk. Also, in the above-described embodiment, the FXP 24 acted as the settlement agent. In other embodiments, the originating bank could wire the funds to the agent bank using conventional wire transfer means, such as via the SWIFT networks, although such a wire transfer may not clear in real time. Also, end-of-day the parties could deduce net obligations and being responsible for messaging clearing files to the responsible entities, with the net obligations being transferred by traditional wire means, again which would likely not be in real time.

In the embodiments described above, the payer specified the country of the beneficiary. In other embodiments, the payer need not identify the beneficiary of the country. In such embodiments, one or more nodes of the DLT network 22 may store a database table that identifies the applicable country for the beneficiary's token. That way, when the payer specifies the beneficiary's token, a computing node of the DLT network 22 can look up the country for the beneficiary based on the beneficiary's token and determine the applicable currency for that country. In other embodiments, the validating node 25 may send a FindToken ( ) API message to each agent bank 20A-N, where the agent banks can respond to the validating node that the beneficiary is either registered or not with the Regional P2P network 23A-N associated with the responding agent bank.

In some cases, a beneficiary may be associated with multiple countries. For example, with reference to FIG. 1, the beneficiary may have a first bank account with the bank 14 that is registered with a first Regional P2P Network 23A and a second bank account with a bank 15 in a second Regional P2P Network 23B; and so on. In such circumstances, according to various embodiments, the payer may select the beneficiary bank account to which the funds are transferred. In an embodiment where the payer makes such a selection, the validating node 25 will identify the two (or more) bank accounts and report this condition to the originating bank computer system 18. The originating bank computer system 18 can then send a query message to the payer, via the money transfer app, requesting that the payer pick the country for the beneficiary. For example, if the beneficiary has registered bank accounts in the UK and Canada associated with his/her token, the originating bank computer system 18 can report back to the payer, via the money transfer app, that the beneficiary has accounts in the UK and Canada, and request that the payer select one of them for the transfer. When the payer makes the selection, via the money transfer app, the process of FIG. 2 can proceed as described above.

Also, in the above description, it was assumed that the beneficiary was in a different country than the payer. That does not need to be the case. If the beneficiary is in the same country at the payer, that is if the Regional P2P Network 23A and the bank 14 for the beneficiary are in the same country as the payer. The process can proceed as described above, except that the steps involving the FXP 24 can be eliminated since no currency conversion is required. That is, for example, as described above, the validator node 25 of the DLT network 22 can identify the agent bank 20A for the beneficiary (in this example, the agent bank 20 would be in the same country as the originating bank 18) and send the payment to the beneficiary's bank 14 via the agent bank 20A.

In various embodiments, when nodes enroll into the DLT network 22, their onboarding software, which is downloaded to the nodes, provides the IP addresses to register with the ecosystem of the network 22. Subsequent participants that download the blockchain-node software can then connect to the initial nodes. From there, the IP addresses of the other nodes can be discovered by asking one of the initial nodes about the addresses of other nodes that joined the network. Indeed, the nodes of the network 22 can inform new nodes that join the network of the IP addresses of the existing nodes. Messages may be written to disk at the computing and, in the case of a connectivity interruption, delivery may be retried until the remote node has acknowledged a message, at which point it is expected to have either reliably stored the message or processed it completely. In various embodiments, all messages may be encoded using a compact binary format. The network messages may also have an associated multi-bit (e.g., 64-bit) session ID, which can be used to group messages. Messages that are successfully processed by a node may generate a signed acknowledgement message called a "receipt." The purpose of the receipts is to give a node undeniable evidence that a counterparty received a notification that would stand up later in a dispute mediation process.

FIG. 1 indicates that each of the originating bank computer system 18, the agent bank computing system 20A-N and the FXP computer systems 24 should have appropriate computer interfaces for connecting to the DLT network 22 so that the nodes can receive and send messages via the network 22.

In another embodiment, instead of using a blockchain, each of the originating bank 18, agent bank 20 and FXP 24 could send messages via a computer network according to distributed application programming interfaces (APIs) that define the message definitions and protocols for implementing the real-time transfers. Such an embodiment is similar to the blockchain embodiment described previously, except that instead of broadcasting the transaction to the blockchain and having details about the transaction recorded on the blockchain's distributed ledger, the originating bank computer system 18, the agent bank computer system 20, and the FXP 24 can exchange messages via a electronic data network (such as a LAN, a WAN, the Internet, etc.) using the APIs to implement the transaction. For example, similar to the blockchain example, the originating bank computer system 18 may send a message, according to the applicable API, to a computing node in the network 22, where the message include the beneficiary's token and the amount to be transferred (e.g., either in the payer's currency or the beneficiary's currency, as described above). The computing node may then validate the transaction, including validating that the beneficiary has a bank account registered with the Regional P2P network 23A. This may require that the agent bank 20A for the beneficiary's Regional P2P network 23A have the appropriate API for receiving and responding to the token registration requests from the computing node. For example, the agent bank computer system 20 may verify that the beneficiary has a registered bank account and send an acknowledgement message, according to the API, back to the computing node. The agent bank computer system 20 may verify that the beneficiary has a registered bank account through a look-up table in database based on the beneficiary's token.

After receiving the acknowledgement message from the agent bank computer system 20, the computing node may then send a message, according to the applicable API, to the FXP 24 for the foreign exchange rate quote and the process may proceed as shown in steps 105-110 of FIG. 2. Again, the FXP 24 would need to the applicable API to receive and respond to the messages from the computing node.

A non-exhaustive list of APIs that the validator node 25 and/or a node of the non-DLT network in such an embodiment may use to perform the transaction steps described herein includes:

FindToken, whose input is the specified token value and whose output (response) is the corresponding agent bank 20 of the beneficiary ValidateToken, whose input is the specified token value and whose output (response) is the first and last names of the beneficiary corresponding to the token MakePayment ( ), whose inputs are a Payment Confirmation ID, the payment amount, the currency, and the beneficiary token, and whose output is the status of the payment or an error code if an error occurred ChangePaymentStatus ( ), whose inputs are the Payment Confirmation ID and the payment status GetStatus ( ), whose input is the Payment Confirmation ID and whose output is the status and bank ID for the bank that provided the status Get FxRate ( ), whose inputs are the Amount, the payer's currency, and the beneficiary's currency)

LockFxRate ( ), whose input is Payment Confirmation ID

CommitFxRate ( ), whose input is Payment Confirmation ID

TracePayment( ), whose input is the Payment Confirmation ID and whose output is the status of the payment or PaymentStop if the payment has been stopped TraceAndRollbackPaymentt( ), whose inputs are the Payment Confirmation ID and the reason for the rollback.

The electronic messages described herein, such as and including electronic messages (i) between the payer 16 and the originating bank computer system 18, (ii) between the originating bank computer system 18 and the agent bank computer system 20, including messages sent via the DLT network 22, (iii) to and from the foreign exchange provider 24, and (iv) between the agent bank computer system 20 and the beneficiary's bank 14, may be any suitable type of electronic message that can be sent over a computer network, and can include packets, frames, datagrams, etc. In that connection, the various computer components described herein can communicate using any suitable network protocol, such as the Transmission Control Protocol (TCP), Internet Protocol (IP), Hypertext Transfer Protocol (HTTP), File Transfer Protocol (FTTP), or any other suitable network protocol. For example, the originating bank computer system 18 can communicate with the DLT network 22 using any of these network protocols, including when it broadcasts the message to the DLT network 22 to initiate the transaction.

Figure 4A:
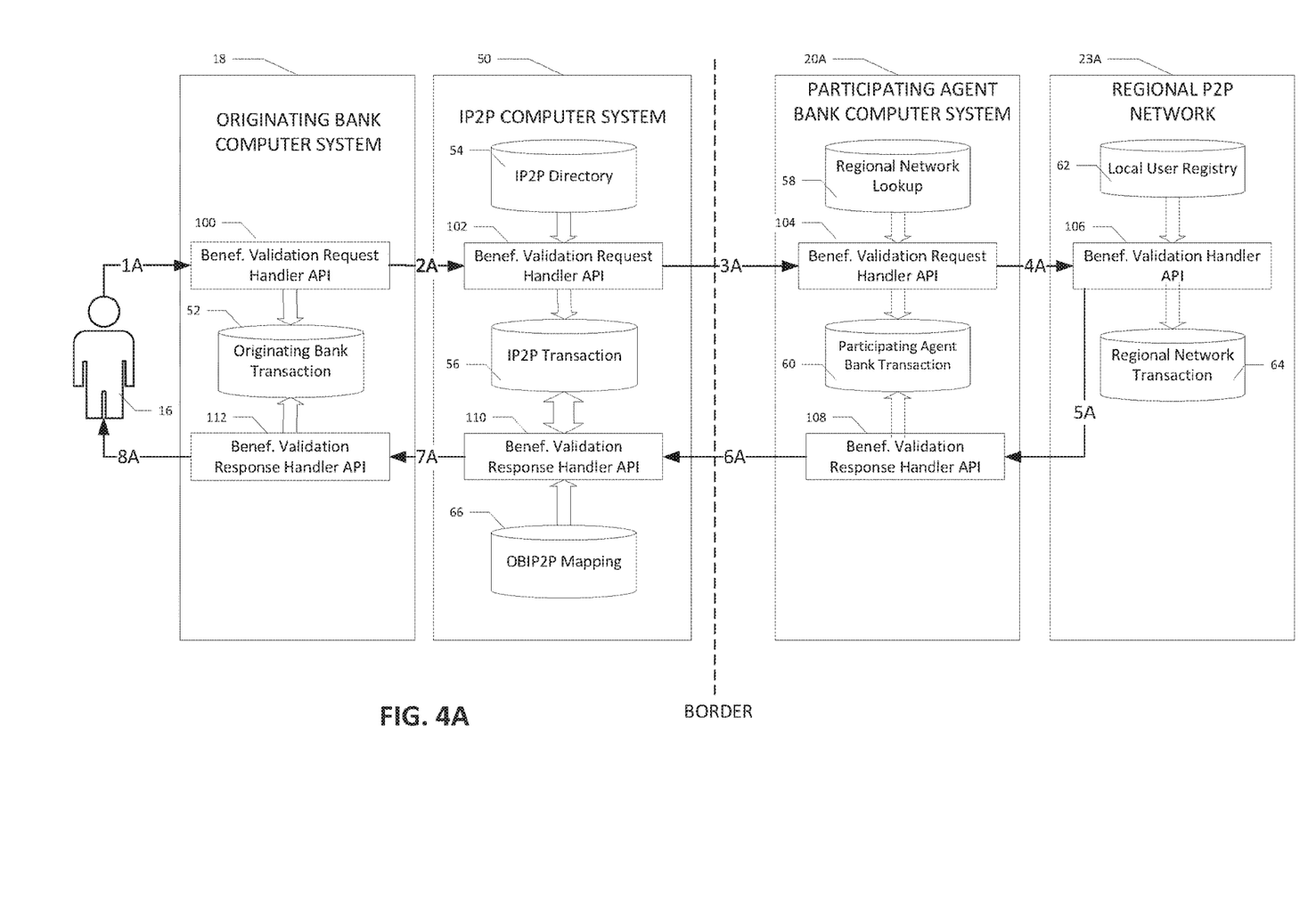
FIGS. 4A-4C illustrate process flows by the system shown in FIG. 1 to implement the bank-account-to-bank-account transfer according to various embodiments of the present invention.
Figure 4B:
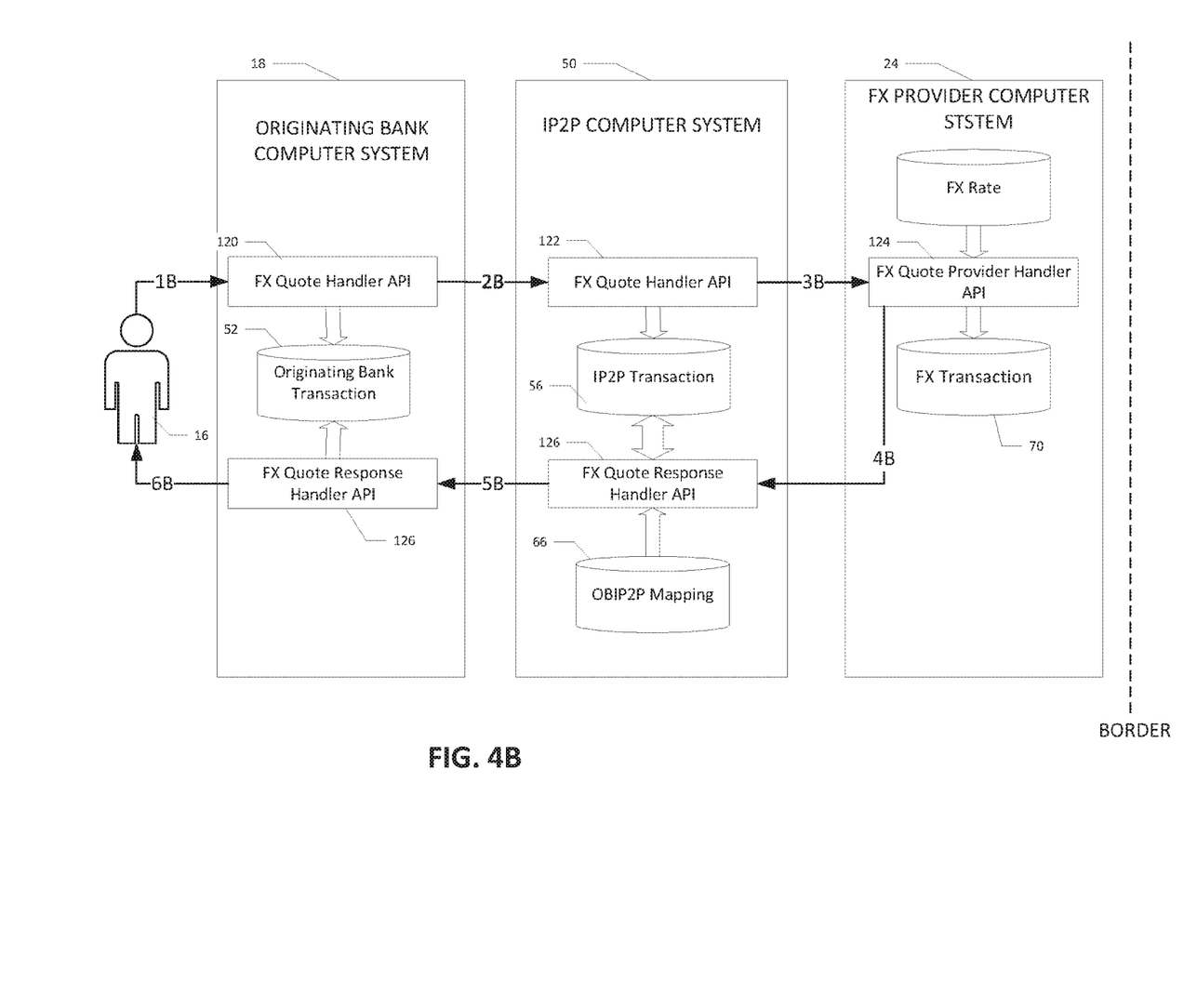
Figure 4C:
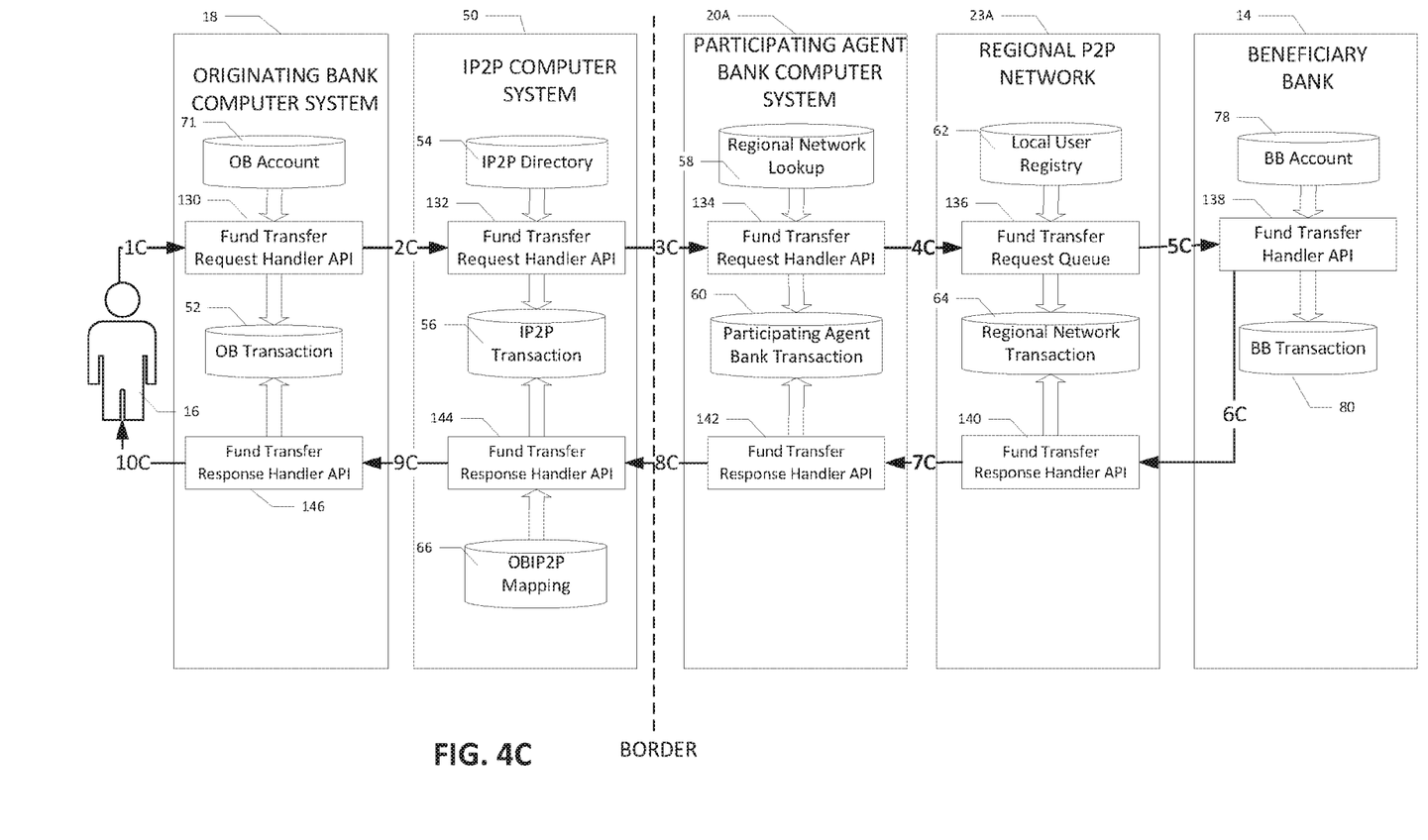
Figure 5:
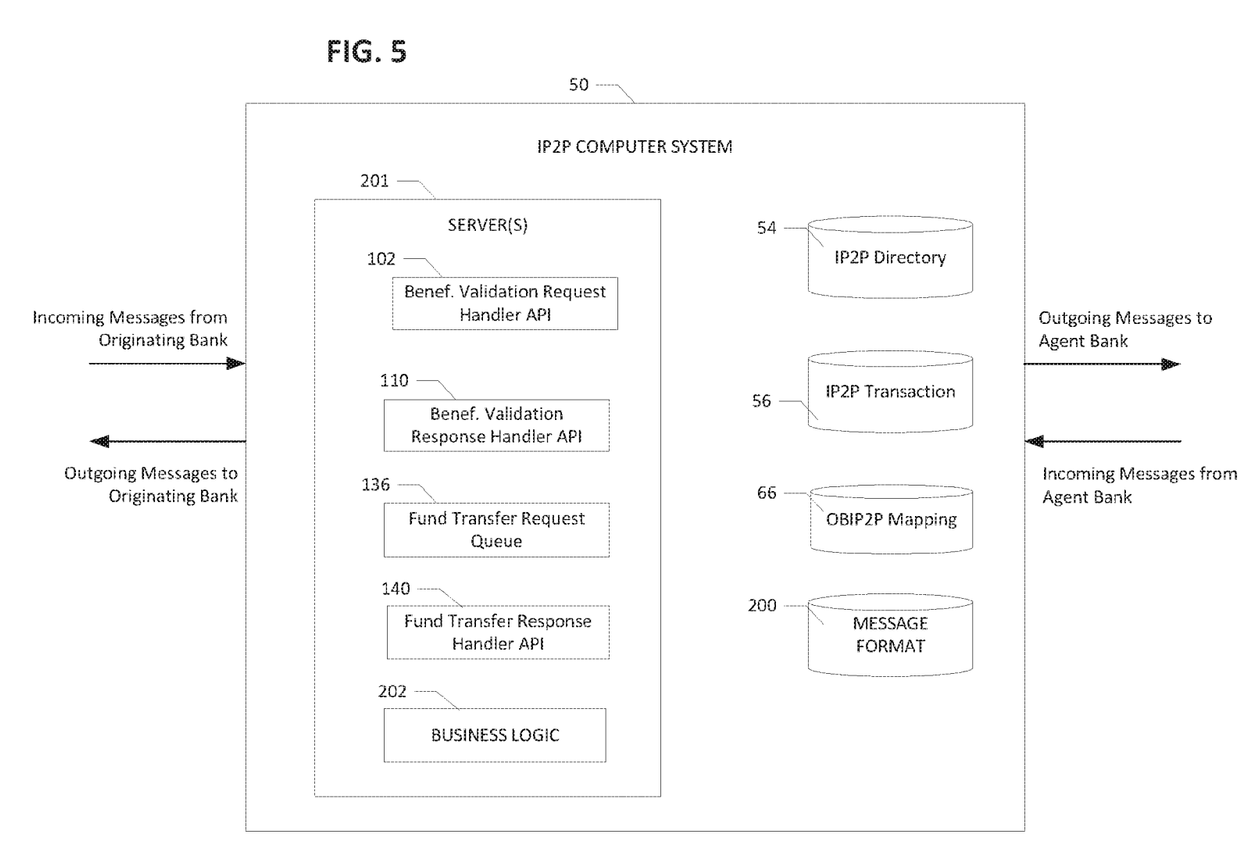
FIG. 5 is a diagram of the IP2P computer system.

FIGS. 4A through 4C depict process flows for a cross-border bank account-to-bank account transfer according to various embodiments of the present invention. FIG. 4A shows a beneficiary validation workflow; FIG. 4B shows a foreign exchange conversion workflow; and FIG. 4C shows a fund transfer workflow. FIG. 4A illustrates the originating bank computer system 18 in communication with a so-called "IP2P" (for internal person-to-person) computer system 50. The IP2P computer system 50 is in turn in communication with a participating agent bank 20A, which is in turn in communication with the regional P2P network 23A in the region of the agent bank 20A. At step 1A, the user 16 (via the user's computer device) initiates a request to the originating bank 18 to make a payment to the beneficiary as described before. The request may include, as described herein, the token identifier for the beneficiary, and the country of the beneficiary's bank account, as shown in the examples of FIGS. 1 and 3. The token identifier for the beneficiary is the identifier that the beneficiary has registered with the Regional P2P Network 23A in the beneficiary's country, and may be the beneficiary's mobile phone number or email address, without other personal identifying information being used by the payer in the request or by the originating bank 18 to identify the beneficiary. As such, the payer does not need to specify the beneficiary's mailing address, beneficiary's bank account number, the beneficiary's bank, the address of the beneficiary's bank, etc. The request is forwarded to an available originating bank service endpoint via an API gateway (not shown). The API gateway invokes a beneficiary validation request handler 100 of the originating bank computer system 18 to initiate the process of validating the beneficiary. The handler 100 makes a database call to the originating bank's transaction table 52 to generate a transaction ID. The transaction record, referenced by the transaction ID, is stored in the originating bank's transaction table 52 with a status of "pending." The transaction ID may also be pushed to the payer 16 for tracking.

All of the API requests and messages described below in connection with FIGS. 4A-4C may be HTTP requests and messages. The various handlers described below, such as the handler 100 of the originating bank 18, may be message handlers that receive an HTTP request and return an HTTP response.

At step 2A, the originating bank 18 transmits an API message, i.e., a common, open banking-based "ValidateToken" API message, to the IP2P computer system. The "ValidateToken" request message, with its transaction ID, may be pushed to a validation queue (not shown) for the IP2P computer system 50, from which the IP2P computer system 50 retrieves the "ValidateToken" request message. The beneficiary validation request handler 102 of the IP2P computer system 50 then fetches, using the country code for the beneficiary in the transaction message, the agent bank details from an IP2P directory 54. The IP2P directory 54 may be similar to the lookup table 28 described above. For example, the IP2P directory 54 may store a network address for each of the agent banks 20A-N, and the IP2P computer system 50 retrieves the agent bank network address corresponding to the beneficiary's country (which is identified in the originating bank's message to the IP2P computer system 50). The transaction record, referenced by the transaction ID, is stored in the IP2P transaction table 56 with a status of pending.

At step 3A, the "ValidateToken" request message is routed from the IP2P computer system 50 to the appropriate participating agent bank 20A. The agent bank's request handler 104 fetches details for the appropriate regional network 23A for the beneficiary from a regional network lookup table 58. The participating agent bank 20A may also translate the common, open-banking-based "ValidateToken" request message to the specific validation data message employed by the regional network 23A. The participating agent bank 20A also stores the transaction request, referenced by the transaction ID, in the participating agent bank transactions table 60 with a status of pending. More exemplary details about the translations performed by the IP2P computer system 50 are provided below.

At step 4A, the "ValidateToken" request message, now translated into the appropriate message type employed by the regional network, is pushed to the regional network 23A. A beneficiary validation handler 106 of the regional network 23A, using the beneficiary's token identifier, validates the beneficiary by confirming the presence of the beneficiary's token identifier in its local user registry database 62. The handler 106 then updates the status of the transaction, referenced by the transaction ID, in the regional P2P network's transaction table 64 to show that the beneficiary is validated.

At step 5A, the regional network 23A pushes the response message to the participating agent bank 20A. The response message may include the first and last names of the beneficiary, as determined by the lookup in the local user registry 62. A validation response handler 108 of the regional network 23A updates the transactions database 60 to show that the beneficiary is validated. At step 6A, the participating agent bank validation response handler 108 pushes the message the IP2P validation response handler 110, which updates the IP2P's transaction table 56 to show that the beneficiary is validated. The IP2P computer system 50 then forwards the message to the originating bank 18 at step 7A, using the original bank mapping table 66 to identify the appropriate originating bank 18. The originating bank validation response handler 112 retrieves the message from the queue and updates its transaction table 52 to show that the beneficiary is validated. Then at step 8A, the originating bank validation response handler 112 forwards notification to the payer on the payer's device 16 that the beneficiary is validated. In various embodiments, the originating bank 18 and the IP2P computer system 50 may be in one country, with the participating agent bank 20A and the regional P2P network 23A in a different country to effectuate the cross-border transfer.

FIG. 4B shows the foreign exchange (FX) conversion workflow according to various embodiments. The FX conversion request is initiated at step 1B by the user 16 requesting the transfer via the money transfer app. As described above, the payer's electronic payment request includes the beneficiary's token identifier and is sent to an available originating bank endpoint via an API gateway (not shown). An originating bank FX quote handler 120 updates the originating bank transaction table 52, using the transaction ID, to show that the FX quote is pending. At step 2B, a common, open-banking-based "FX quote" request API message is passed to a FX quote handler 122 of the IP2P computer system 50, which updates the IP2P transaction table 56, by reference to the transaction ID, to show that the FX quote is pending. At step 3B, the transaction message is pushed by the FX quote handler 122 to a message queue, from which the FX quote provider handler 124 of the FX provider computer system 24 retrieves the message.

The FX quote provider handler 124 queries its FX rate database 67 to look up the applicable exchange rate given the payer's and beneficiary's currencies. The FX quote provider handler 124 then updates the FX transaction table 70, by reference to the transaction ID, to show that the FX quote is processed. The FX transaction table 70 may also be updated to store the quoted exchange rate and a time duration for this the rate quote is valid. At step 4B the response message is then pushed to the FX quote response handler 126 of the IP2P computer system 50. The response message from the FX provider 24 includes the applicable exchange rate and validity period during which the provided exchange rate is valid. The FX quote response handler 126 of the IP2P computer system 50 then updates its transaction table 56 to show that the FX quote is processed. Then at step 5B, the IP2P computer system 50, using the originating bank mapping table 66, passes the message back to the FX quote response handler 128 of the originating bank 18, which updates its transaction table 52 to show that the FX quote is processed. Then at step 6B, the originating bank 18 passes the status onto the payer 16. The status message may show the quoted rate so that the payer 16 knows what rate will be applied. The message to the user 16 may also provide the payer 16 the opportunity to accept or reject the quote. As shown by the border in FIG. 4B, the payer 16, the originating back computer system 24, the IP2P computer system 50 and the FX provider computer system may be located in the same country (i.e., the payer's country).

FIG. 4C shows the fund transfer workflow according to various embodiments. At step 1C, the payer 16 initiates a request to the originating bank computer system 18 to transfer the funds from payer's bank account to the beneficiary's bank account as described before. An API gateway (not shown) invokes a fund transfer API within the originating bank 18. In response, a fund transfer request handler 130 of the originating bank deducts the payment amount from the payer's account in the originating bank's account database 71. The fund transfer request handler 130 also updates the originating bank's transaction table, using the transaction ID, to show that the fund transfer is pending. At step 2C, the originating bank 18 transmits a fund transfer request message using a common, open-banking API message (e.g., a "MakePayment" message) to the IP2P computer system 50. A fund transfer request handler 132 of the IP2P computer system 50, using the beneficiary's country code from the message, fetches the agent bank details for the agent bank in the country to which the fund transfer request needs to be directed using the IP2P directory 54 as described before. The IP2P transaction table 56 is also updated to show that the fund transfer request is pending.

At step 3C, the request is routed by the IP2P computer system 50 to the regional participating agent bank computer system 20A, as determined by the IP2P computer system at step 2C. A fund transfer request handler 134 of the agent bank 20A identifies the regional network to which the request needs to be directed using its regional network lookup directory 58 and translate the common, open-banking message to the message type used by the regional network 23A. The fund transfer request handler 134 also updates the participating agent bank's transaction table 60 to show that the fund transfer is pending.

At step 4C, the message is pushed to the appropriate regional network 23A and a fund transfer request handler 136 validates the beneficiary token in the local user registry successfully. The fund transfer request handler 136 also updates the agent bank transaction table 64 to show that the request is pending. At step 5C, the regional network 23A routes the request to the beneficiary's bank (as identified by the regional network 23A at step 4C). A fund transfer processing handler 138 looks up the beneficiary's account information based on the beneficiary toke in the message and credits the beneficiary's account in the bank's account database 78. The fund transfer processing handler 138 also updates the beneficiary bank transaction table 80 to show that the fund transfer is now processed.

The response message from the beneficiary bank 14 is then pushed to the regional network 23A at step 6C. A fund transfer response handler 140 at the regional network 23A updates the regional network transaction table 64 to show that the transfer is processed, and pushes the response message to the agent bank 20A at step 7C. A fund transfer response handler 142 at the agent bank 20A updates the agent bank transaction table 60 to show that the transfer is processed, and pushes the response message to the IP2P computer system 50 at step 8C. In turn, a fund transfer response handler 144 of the IP2P computer system 50 updates the IP2P transaction table 56 to show that the transfer is processed, and pushes the response message to the originating bank 18 at step 9C. The fund transfer response handler 146 of the originating bank 18 updates the originating bank transaction table 52 to show that the transfer is processed, and pushes the response message to the payer 16 at step 10C.

As described previously, the processes of FIGS. 4A-C can be available and performed at any time of day, any day of the year. As such, the processes are not subject to the local hours of the originating or agent of beneficiary banks. The process can also take place in real-time, e.g., as fast as it take the above-described computer systems and databases to perform their described functions.

As mentioned above, the IP2P computer system 50 may translate the incoming API requests to the corresponding message format employed by the relevant regional network 23, and correspondingly may translate response messages from the regional network 23 to the message format employed by the IP2P computer system 50. In various embodiments, the IP2P computer system 50 may employ business logic to make such translations. For example, the fields of the incoming API requests from the originating bank 18 using the open-banking API IP2P message formats to validate the beneficiary and/or transfer the funds between bank accounts may not correspond to message fields used by the relevant regional network 23 for its API messaging format. To make the necessary translations, the IP2P computer system may use coding logic, a rules engine, a database lookup, and any other suitable technique. Once the applicable regional network for the transfer is determined, the IP2P computer system 50 can employ business logic 202 to determine how the fields in the incoming messages from the originating bank 18 should be converted (or translated) to the message format used by the relevant regional network 23. For example, if the beneficiary's bank account is with a Canadian bank (and the payer is outside of Canada), the business logic 202 can convert the messages from the originating bank 18 to the format used by the Canadian regional network (which is Interac). Once converted/translated, the IP2P computer system 50 can forward the converted/translated message to the agent bank 20 for Canada. Correspondingly on the response side, the IP2P computer system 50 can employ the business logic 202 can convert/translate response messages from the agent bank 20 to the API message format used by the IP2P computer system.

The IP2P computer system 50 may employ a multi-tier architecture such that the business logic 202 is separate from other tiers or layers, such as the IP2P computer system's data access layer or service layer.

The originating bank, agent bank, the IP2P computer system and foreign exchange provider computer systems can be implemented with one or a network of servers. Each such server may comprise one or more processor cores and computer memory for storing software executed by the processor core(s). For example, referring to FIGS. 4A-4C, the IP2P computer system 50 and the FX provider computer system 24 may be implemented with an on-demand cloud computing platform servicing a region in the payer's country. Also, the agent bank computer system 20A may run on an on-demand cloud computing platform servicing a region in the beneficiary's country.

The program instructions (e.g., software) could be stored in computer memory that is accessible by the processor cores, such as RAM, ROM, processor registers or processor cache, for example. Data may be shared between the various systems using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to a method of operating computing nodes of a computer network. The method comprises receiving, by an originating entity computer system 18 that includes at least one computing node, an electronic message from a computer device 16 of a payer to transfer money from a bank account of the payer in a first country to a bank account of a beneficiary in a second country, where the second country is different than the first country, and where the electronic message is received via a first country digital payment system and comprises a request for a transaction by the payer to transfer Y units of second country currency to the bank account of the beneficiary in the second country from the bank account of the payer in the first country. The electronic message from the payer comprises a token that is a registered identifier of the beneficiary with a second country digital payment system and wherein the received request does not include any other information identifying bank account of the beneficiary. The method further comprises the step of sending, by the originating entity computer system 18 and to a distributed ledger technology (DLT) network 22, a message initiating the transaction, where the message is endorsed with a cryptographic key of the originating entity computer system 18. The message further comprises validating, by a validator computing node 25 of the DLT network 22, the transaction, where validating the transaction comprises: (i) verifying, by the validator computing node 25, that the cryptographic key of the originating entity computer system is valid; and (ii) verifying, by the validator computing node 25 and based on the token, that the beneficiary has a bank account registered with the second country digital payment system. The step of verifying that the beneficiary has a bank account registered with the second country digital payment system may comprise: (a) determining, by the validator computing node 25, an agent entity 20A in the second country for the transaction; and (b) sending, by the validator computing node 25 and via the DLT network 22, an electronic query message to the agent entity 20A in the second country querying whether the beneficiary has a registered bank account with the second country digital payment system.

The method may further comprise the step of, in response to receiving a verification that the beneficiary has the registered bank account with the second country digital payment system, obtaining, by the validator computing node 25, from a foreign exchange provider computer system of a foreign exchange provider 24 and via the DLT network 22, a foreign exchange currency quote that X units of first country currency converts to Y units of the second country currency, where the foreign exchanger provider has a first nostro account for an originating entity and a second nostro account for the agent entity. The method may further comprise, upon acceptance of the foreign exchange currency quote, transferring, by the agent entity computer system 20A via the second country digital payment system 23A and using the token for identifying the beneficiary, a payment of the Y units of the second country currency to the bank account of the beneficiary; debiting, by the foreign exchange provider computer system 24, the first nostro account of the originating entity the X units of the first country currency and crediting the second nostro account of the agent entity the Y units of the second country currency; debiting, by the originating entity computer system 18, the bank account of the payer the X units of the first country currency; and crediting, by the second country digital payment system 23A, the bank account of the beneficiary the Y units of the second country currency by transferring the Y units of the second country currency from the second nostro account of the agent entity to the bank account of the beneficiary.

In another general aspect, the present invention is directed to a system that comprises an agent entity computer system 20A including at least one computing node and an originating entity computer system 18 including at least one computing node. The originating entity computer system 18A is configured to receive an electronic message from a computer device 16 of a payer to transfer money from a bank account of the payer in a first country to a bank account of a beneficiary in a second country, where the second country is different than the first country, and where the electronic message is received via a first country digital payment system and comprises a request for a transaction by the payer to transfer Y units of second country currency from the bank account of the payer in the first country to the bank account of the beneficiary in the second country. The electronic message from the payer comprises a token that is a registered identifier of the beneficiary with a second country digital payment system and where the received request does not include any other information identifying the bank account of the beneficiary. The originating entity computer system 18 also send to a distributed ledger technology (DLT) network 22 a message initiating the transaction, where the message is endorsed with a cryptographic key of the originating entity computer system. The DLT network 22 comprises a plurality of computing nodes 25 that are configured to: verify that the cryptographic key of the originating entity computer system is valid and verify, based on the token, that the beneficiary has a bank account registered with the second country digital payment system by: (i) determining an agent entity in the second country for the transaction; and (ii) sending an electronic query message to the agent entity in the second country querying whether the beneficiary has a registered bank account with the second country digital payment system. In response to receiving a verification that the beneficiary has the registered bank account with the second country digital payment system, the DLT network 22 obtains, from a foreign exchange provider computer system of a foreign exchange provider 24, a foreign exchange currency quote that X units of first country currency converts to Y units of the second country currency, where the foreign exchange provider has a first nostro account for an originating entity and a second nostro account for the agent entity. Upon acceptance of the foreign exchange currency quote, the agent entity computer system 20A is configured to transfer, via the second country digital payment system and using the token for identifying the beneficiary, a payment of the Y units of the second country currency to the bank account of the beneficiary; the foreign exchange provider computer system is configured to debit the first nostro account of the originating entity the X units of the first country currency, and credit the second nostro account of the agent entity the Y units of the second country currency; and the second country digital payment system is configured to credit the bank account of the beneficiary the Y units of the second country currency by transferring the Y units of the second country currency from the second nostro account of the agent entity to the bank account of the beneficiary.

These transaction steps preferably are completed in real-time, and a distributed ledger of the DLT network records data about the transaction, the data comprising, among other things, the token, acceptance by the originating entity and the agent entity of the transaction, and the foreign exchange currency quote.

In various implementations, the originating entity is an originating bank, and the agent entity is an agent bank. Also, the computer device 16 of the payer may be a mobile computing device, and the electronic message transferring the money from the bank account of the payer to the bank account of the beneficiary may be made via an app running on the computer device of the payer. In addition, the method may also comprise the step of accepting, by either of or both the originating entity computer system and the payer, the foreign exchange currency quote.

In various implementations, the electronic message from the computer device of the payer transferring the money identifies a country of the beneficiary, although in other circumstances, it may not so identify the country of the beneficiary. In the later case, the step of determining the agent entity for the transaction may comprise performing, by the validator computing node 25, a database look-up based on the beneficiary's token identifying the agent entity or transmitting, by the validator computing node 25, a Find-Token API message to a plurality of agent entities 20A-20N.

In another general aspect, the present invention is directed to a computer-implemented method comprising the step of receiving, by an originating entity computer system 18 that includes at least one computing node, an electronic message from a computer device 16 of a payer to transfer money from a bank account of the payer in a first country to a bank account of a beneficiary in a second country, where the second country is different than the first country, and where the electronic message comprises a request for a transaction by the payer to transfer Y units of second country currency to the bank account of the beneficiary in the second country from the bank account of the payer in the first country. The electronic message from the payer comprises a token that is a registered identifier of the beneficiary with a second country digital payment system and where the received request does not include any other information identifying bank account of the beneficiary. The method may further comprise the steps of sending, by the originating entity computer system 18, to an international payment transfer computer system 50, a first API message requesting validation of the beneficiary; determining, by the international payment transfer computer system 50, an agent bank 20A in the second country; translating, by the international payment transfer computer system 50, the first API message requesting validation of the beneficiary to a message type used by the second country to validate the beneficiary; and sending, by the international payment transfer computer system 50, the translated first API message requesting validation of the beneficiary to the agent bank 20A. The method further comprises sending, by the agent bank 20A, the translated first API message requesting validation of the beneficiary to the second country digital payment system 23A; and validating, by the second country digital payment system 23A, the beneficiary in response to receiving the translated first API message requesting validation of the beneficiary.

The method further comprises sending, by the international payment transfer computer system 50, a second API message to a foreign exchange provider 24 requesting an exchange rate quote for converting a quantity of the first country currency to the Y units of second country currency; replying, by the foreign exchange provider 24 to the international payment transfer computer system 50, a foreign exchange quote for the transfer that X units of first country currency convert to the Y units of second country currency; and sending, by the international payment transfer computer system 50, the foreign exchange quote to the originating entity computer system 18.

The method further comprises debiting, by the originating bank computer system 18, X units of first country currency from the payer's bank account and sending, by the originating bank computer system 18, a third API message to the international payment transfer computer system 50 to transfer funds to the beneficiary's bank account. The method further comprises translating, by the international payment transfer computer system 50, the third API message requesting the funds transfer to a message type used by the agent bank 20A in the second country to transfer funds; sending, by the international payment transfer computer system 50, the translated third API message to the agent bank 20A; sending, by the agent bank 20A, the translated third API message to the second country digital payment system 23A; sending, by the second country digital payment system 20A, the translated third API message to a bank 14 of the beneficiary, which credits the bank account of the beneficiary with the Y units of second country currency.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method comprising:
receiving, by an originating entity computer system that includes at least one computing node, an electronic message from a computer device of a payer to transfer money from a bank account of the payer in a first country to a bank account of a beneficiary in a second country, wherein the second country is different than the first country, wherein the electronic message comprises a request for a transaction by the payer to transfer Y units of second country currency to the bank account of the beneficiary in the second country from the bank account of the payer in the first country, wherein the electronic message from the payer comprises a token that is a registered identifier of the beneficiary with a second country digital payment system and wherein the received request does not include any other information identifying bank account of the beneficiary;
sending, by the originating entity computer system, to an international payment transfer computer system, a first API message requesting validation of the beneficiary;
determining, by the international payment transfer computer system, an agent bank in the second country;
translating, by the international payment transfer computer system, the first API message requesting validation of the beneficiary to a message type used by the second country to validate the beneficiary;
sending, by the international payment transfer computer system, the translated first API message requesting validation of the beneficiary to the agent bank;
sending, by the agent bank, the translated first API message requesting validation of the beneficiary to the second country digital payment system;
validating, by the second country digital payment system, the beneficiary in response to receiving the translated first API message requesting validation of the beneficiary;
sending, by the international payment transfer computer system, a second API message to a foreign exchange provider requesting an exchange rate quote for converting a quantity of the first country currency to the Y units of second country currency;
replying, by the foreign exchange provider to the international payment transfer computer system, a foreign exchange quote for the transfer that X units of first country currency convert to the Y units of second country currency;
sending, by the international payment transfer computer system, the foreign exchange quote to the originating entity computer system;
debiting, by the originating bank computer system, X units of first country currency from the payer's bank account;
sending, by the originating bank computer system, a third API message to the international payment transfer computer system to transfer funds to the beneficiary's bank account;
translating, by the international payment transfer computer system, the third API message requesting the funds transfer to a message type used by the agent bank in the second country to transfer funds;
sending, by the international payment transfer computer system, the translated third API message to the agent bank;
sending, by the agent bank, the translated third API message to the second country digital payment system;
sending, by the second country digital payment system, the translated third API message to a bank of the beneficiary; and
crediting, by the bank of the beneficiary, the bank account of the beneficiary with the Y units of second country currency.

2. The method of claim 1, further comprising after receiving, by the originating entity computer system, the electronic message from the computer device of the payer to transfer money from the bank account of the payer to the bank account of the beneficiary, making, by a message handler the originating entity computer system, a database call to a transaction table of the originating entity computer system to generate a transaction ID for the transaction.

3. The method of claim 2, further comprising each of the originating bank, the international payment transfer computer system, the agent bank, the second country digital payment system and the bank of the beneficiary storing in a respective database thereof details of the transaction, wherein the details of the transaction stored in each of the respective databases are referenced by the transaction ID.

4. The method of claim 3, wherein the computer device of the payer is a mobile computing device, and wherein the electronic message transferring the money from the bank account of the payer to the bank account of the beneficiary is made via an app running on the computer device of the payer.

5. A system comprising:
an originating bank computer system;
an international payment transfer computer system in communication with the originating bank computer system; and
a foreign exchange provider in communication with the international payment transfer computer system, wherein:
the originating entity computer system is configured to:
receive an electronic message from a computer device of a payer to transfer money from a bank account of the payer in a first country to a bank account of a beneficiary in a second country, wherein the second country is different than the first country, wherein the electronic message comprises a request for a transaction by the payer to transfer Y units of second country currency to the bank account of the beneficiary in the second country from the bank account of the payer in the first country, wherein the electronic message from the payer comprises a token that is a registered identifier of the beneficiary with a second country digital payment system and wherein the received request does not include any other information identifying bank account of the beneficiary; and
send to the international payment transfer computer system, a first API message requesting validation of the beneficiary;
the international payment transfer computer system is configured to:
determine an agent bank in the second country;
translate the first API message requesting validation of the beneficiary to a message type used by the second country to validate the beneficiary;
send the translated first API message requesting validation of the beneficiary to the agent bank;
following receipt of validation of the beneficiary from the agent bank, send a second API message to the foreign exchange provider requesting an exchange rate quote for converting a quantity of the first country currency to the Y units of second country currency;
receive, from the foreign exchange provider, a foreign exchange quote for the transfer that X units of first country currency convert to the Y units of second country currency; and
send the foreign exchange quote to the originating entity computer system so that the originating bank computer system debits X units of first country currency from the payer's bank account;
the originating entity computer system is further configured to send a third API message to the international payment transfer computer system to transfer funds to the beneficiary's bank account; and
the international payment transfer computer system is further configured to:
translate the third API message requesting the funds transfer to a message type used by the agent bank in the second country to transfer the funds; and
send the translated third API message to the agent bank so that the agent bank communicates with the second country digital payment system, which communicates with a bank of the beneficiary so that the bank of the beneficiary credits the bank account of the beneficiary with the Y units of second country currency.

6. The system of claim 5, wherein:
the originating entity computer system comprises a message handler and a transaction table; and
the message handler is configured to, after receiving, by the originating entity computer system, the electronic message from the computer device of the payer to transfer money from the bank account of the payer to the bank account of the beneficiary, make a database call to the transaction table to generate a transaction ID for the transaction.

7. The system of claim 6, wherein each of the originating bank, the international payment transfer computer system and foreign exchange provider comprise a database for storing, respectively, details of the transaction, and wherein the details of the transaction stored in each of the respective databases are referenced by the transaction ID.

8. The system of claim 7, wherein the computer device of the payer is a mobile computing device, and wherein the electronic message transferring the money from the bank account of the payer to the bank account of the beneficiary is made via an app running on the computer device of the payer.

9. The system of claim 7, wherein:
the system is configured to transfer funds to beneficiaries in a network of multiple foreign countries, including the second country;
the international payment transfer computer system is configured to determine the agent back in the second country by retrieving, from a directory, a network address for the agent bank in the second country using a country code in the first API message; and
the first API message comprises the transaction ID.

10. The system of claim 9, wherein the international payment transfer computer system is capable of translating the first API message to the message type used by any foreign country in the network and translates the first API message to the message type of the second country based on the country code for the second country in the first API message.

* * * * *